United States Patent
Jayaraman et al.

(10) Patent No.: US 8,869,271 B2
(45) Date of Patent: Oct. 21, 2014

(54) SYSTEM AND METHOD FOR RISK RATING AND DETECTING REDIRECTION ACTIVITIES

(75) Inventors: Shankar Jayaraman, Bangalore (IN); Vikas Singh, Bangalore (IN); Jayesh K. Sreedharan, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 634 days.

(21) Appl. No.: 12/698,922

(22) Filed: Feb. 2, 2010

(65) Prior Publication Data
US 2011/0191849 A1     Aug. 4, 2011

(51) Int. Cl.
*G06F 21/56*     (2013.01)
*G06F 21/00*     (2013.01)
*H04L 29/06*     (2006.01)
*H04L 29/08*     (2006.01)

(52) U.S. Cl.
CPC ........ *H04L 63/1441* (2013.01); *H04L 67/2814* (2013.01); *H04L 67/02* (2013.01); *H04L 63/1483* (2013.01); *H04L 63/1416* (2013.01)
USPC .............................................. 726/22; 726/25

(58) Field of Classification Search
USPC .................................................. 726/22–26
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 7,562,304 B2 | 7/2009 | Dixon et al. | |
| 8,037,073 B1 * | 10/2011 | Kapoor et al. | 707/740 |
| 2006/0253581 A1 * | 11/2006 | Dixon et al. | 709/225 |
| 2007/0039038 A1 * | 2/2007 | Goodman et al. | 726/2 |
| 2007/0208822 A1 | 9/2007 | Wang et al. | |
| 2010/0251329 A1 * | 9/2010 | Wei | 726/1 |
| 2011/0040867 A1 * | 2/2011 | Kalbag | 709/224 |

FOREIGN PATENT DOCUMENTS

WO     WO 2011/096987     8/2011

OTHER PUBLICATIONS

HTTP HEAD request usage—Wikipedia Nov. 2010 (with user comments dated one year earlier).*
An Exploration of Dynamic Documents, Website: http://256.com/gray/docs/netscape/pushpull.html, printed Jan. 19, 2010, 8 pages.

(Continued)

*Primary Examiner* — Jung Kim
*Assistant Examiner* — Tri Tran
(74) *Attorney, Agent, or Firm* — Patent Capital Group

(57) ABSTRACT

A method in one example implementation includes sending a first request to a first network address on a first server and determining whether the first network address has been redirected on the server to a second network address. The method further includes searching a memory element for a predetermined risk rating associated with the second network address if the first network address has been redirected to the second network address. The method also includes providing a risk response to a client if a predetermined risk rating is found. In more specific embodiments, the risk response includes sending an alert to the client or blocking the client from accessing the second network address if the predetermined risk rating indicates the second network address is malicious. In other more specific embodiments, the first network address is redirected to one or more other network addresses before being redirected to the second network address.

20 Claims, 6 Drawing Sheets

(56) References Cited

OTHER PUBLICATIONS

McAfee, Prevention is the Best Medicine, "Safe surfing and searching from McAfee," White Paper, Jul. 2007, Website: www.mcafee.com.

Trend Micro, Threat Management, "Web Threats: Focus on Malicious URLS," White Paper, Oct. 2008, 10 pages.

McAfee, "McAfee Artemis Technology—Always-On, Real-Time Protection," copyright 2008 McAfee, Inc., 3 pages.

Open Directory—Computers: Internet: Web Design and Development: Hosted Components and Services: Redirects, Website: http://www.dmoz.org/Computers/Internet/Web_Design_and_Development/Hosted_Components_and_Services/Redirects, printed on Feb. 2, 2010; 4:36:38 pm, 2 pages.

Norton, Safe Site—Safe Shopping Websites, "What is Norton Safe Search?", Website: http://www.symantec.com/norton/theme.jsp?themeid=safe_search, printed on Feb. 2, 2010; 4:43:11 pm, 3 pages.

TrendSecure, "TrendProtect™ Overview," Website: http://www.trendsecure.com/portal/enUs/tools/security_tools/trendprotect, printed Feb. 2, 2010, 2 pages.

Trend Micro™ Smart Protection Network™—Trend Micro USA, Website: http://us.trendmicro.com/us/trendwatch/core-technologies/smar-protection-network, printed Feb. 3, 2010, 1 page.

McAfee SiteAdvisor Software—Website Safety Ratings and Secure Search, "What is SiteAdvisor software?", Website: http://www.siteadvisor.com/howitworks/index.html, printed Mar. 12, 2010, 3 pages.

International Search Report and Written Opinion, International Application No. PCT/US2010/060355, mailed May 3, 2011 (9 pages).

International Preliminary Report on Patentability and Written Opinion, Issued Aug. 7, 2012, International Application No. PCT/US2010/060355, 6 pages.

* cited by examiner

SYSTEM AND METHOD FOR RISK RATING AND DETECTING REDIRECTION ACTIVITIES

TECHNICAL FIELD

This disclosure relates in general to the field of network security and, more particularly, to risk rating and detecting redirection activities in a computer network environment.

BACKGROUND

The field of network security has become increasingly important in today's society. The Internet has enabled interconnection of different computer networks all over the world. It has provided a medium for users to access a vast amount of information resources and services. For example, the World Wide Web allows end users to access documents in the form of web pages over the Internet by simply requesting access to a valid network address or Uniform Resource Locator (URL) (e.g., network address that may include a protocol, a hostname, and a path to the filename). In another example, end users may exchange files with other end users or servers across the Internet. The wide-ranging security threats accompanying these and other uses of the Internet, however, present significant obstacles to individual users and organizations to maintain secure computer systems and to protect confidential information.

Many legitimate and useful techniques used in Internet communications are often exploited for malicious purposes. For example, URL redirection is a technique used to make web pages available under more than one URL. While URL redirection has several beneficial uses, many deceptive Internet tactics, such as web-based phishing, drive-by-downloads and other social engineering attacks, employ URL redirection techniques to redirect unsuspecting users to malicious websites. Some malicious websites may be designed to deceive users into downloading seemingly legitimate software that is actually some form of malware. Other malicious websites may be designed to trick users into providing personal or otherwise confidential information. As these tactics evolve, security professionals need to develop innovative tools to combat such tactics that seek to infect computer systems with malware and to obtain confidential information from end users.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method in one example implementation includes sending a first request to a first network address on a first server device and determining whether the first network address has been redirected on the first server device to a second network address. The method further includes searching a memory element for a predetermined risk rating associated with the second network address if the first network address has been redirected to the second network address. Finally, the method includes providing a risk response to a client device if a predetermined risk rating is found. In more specific embodiments, the risk response comprises sending an alert to the client device or blocking access to the second network address if the predetermined risk rating indicates the second network address is malicious. In another more specific embodiment, the method further comprises receiving a first response with a status code indicating whether the first network address has been redirected, where the first response includes the second network address if the status code indicates the first network address has been redirected. In other more specific embodiments, the first network address may be redirected to one or more other network addresses before being redirected to the second network address and the memory element may be searched for each of the one or more other network addresses to determine if a predetermined risk rating is associated with any of the other network addresses.

Example Embodiments

Figure 1:
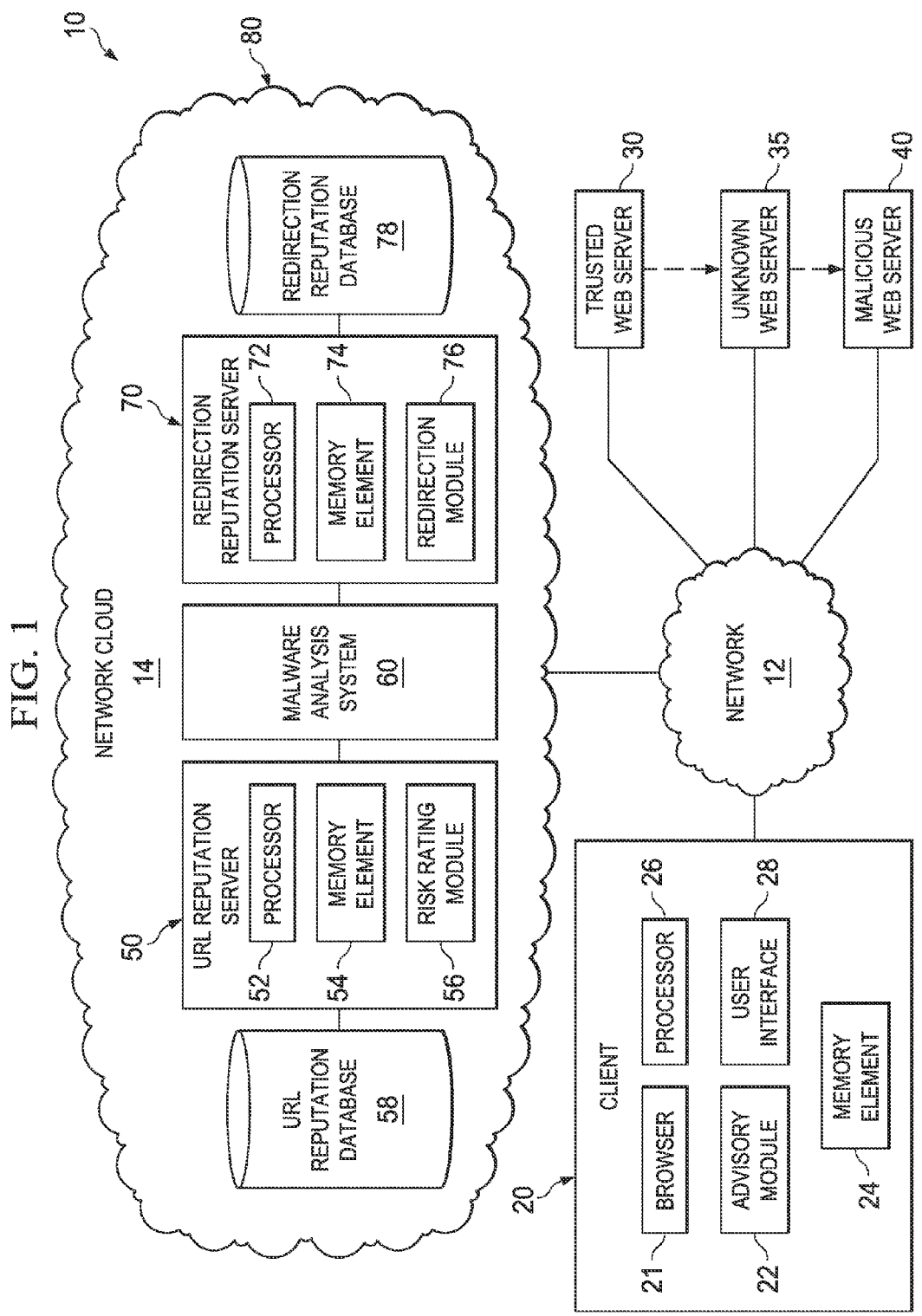
FIG. 1 is a simplified block diagram of a system for risk rating and detecting redirection activities in a network environment in accordance with one embodiment.

FIG. 1 is a simplified block diagram of one embodiment of a system 10 for risk rating and detecting redirection activities in a computer network environment. In system 10, one or more networks 12 may be operably connected to one or more client devices such as client 20. Client 20 may include a browser 21, an advisory module 22, a memory element 24, a processor 26, and a user interface 28. A plurality of server devices may also be operably connected to network 12 including, for example, a trusted web server 30, an unknown web server 35, and a malicious web server 40. Network 12 may also be operably connected to a reputation system 80 shown in a network cloud 14. Reputation system 80 may include a malware analysis system 60 operably coupled to a URL (i.e., Uniform Resource Locator) reputation server 50 and a redirection reputation server 70. URL reputation server 50 may include a processor 52, a memory element 54, and a risk rating module 56. Redirection reputation server 70 may include a processor 72, a memory element 74, and a redirection module 76. Additionally, URL reputation server 50 and redirection reputation server 70 may be operably coupled to URL reputation database 58 and redirection reputation database 78, respectively.

Not shown in FIG. 1 is additional hardware that may be suitably coupled to processors 26, 52, and 72 in the form of memory management units (MMU), additional symmetric multiprocessing (SMP) elements, physical memory, Ethernet, peripheral component interconnect (PCI) bus and corresponding bridges, small computer system interface (SCSI)/integrated drive electronics (IDE) elements, etc. Any servers and other computers associated with system 10, such as, for example, trusted web server 30, unknown web server 35, malicious web server 40, and malware analysis system 60, will also include appropriate processors, memory elements, and other additional hardware necessary to properly perform their intended functions. Furthermore, any suitable operating systems may also be configured in client 20 and any servers and other computers associated with system 10 to appropriately manage the operation of hardware components therein.

In example embodiments, system 10 may be utilized to alert end users about malicious URL redirections and to update URL reputation database 58 and redirection reputation database 78, as needed, with risk ratings for URLs detected and analyzed during URL redirection. When an end user requests access to a web page using a valid URL or receives document files, flash files, or media files with embedded URLs, these "parent" URLs are tested to determine whether they have been redirected at the server side to a final URL. System 10 may determine the final URL to which the parent URL has been directed. If the final URL has an associated risk rating in URL reputation database 58 or redirection reputation database 78, then appropriate action may be taken such as, for example, alerting the user of the risk rating or blocking access to the parent URL if the final URL has a malicious risk rating. If the final URL does not have an associated risk rating, then the final URL may be submitted to malware analysis system 60 to determine a risk rating and update the appropriate reputation databases 58 and/or 78. Additionally, any intermediate URLs to which the parent URL is directed before reaching the final URL may also be evaluated and submitted to malware analysis system 60, if necessary.

For purposes of illustrating the techniques of system 10, it is important to understand the activities occurring within a given network. The following foundational information may be viewed as a basis from which the present disclosure may be properly explained. Such information is offered earnestly for purposes of explanation only and, accordingly, should not be construed in any way to limit the broad scope of the present disclosure and its potential applications. In addition, it will be appreciated that the broad scope of this disclosure intends for references to "end user" or "user" to apply to any type of user with a computer having network access (e.g., Internet, etc.) including, for example, individual users as well as users within any type of organization (e.g., company, school, government, etc.).

Typical network environments used in organizations and by individuals include the ability to communicate electronically with other networks using, for example, the Internet to access web pages hosted on servers connected to the Internet, to send or receive electronic mail (i.e., email) messages, or to exchange files with end users or servers connected to the Internet. Malicious users are continuously developing new tactics using the Internet to spread malware and to gain access to confidential information. In particular, useful techniques that can facilitate communication between an end user and other computer networks are often misused in order to perpetrate some type of malicious Internet scheme or fraud.

URL redirection is one such useful technique that is used on the World Wide Web to make web pages accessible under different URLs. URL redirection occurs when an end user requests access to a web page having a particular network address or URL, and the end user actually receives a web page having a different URL. For example, when a website changes its domain name, the server hosting the old domain name may be configured to redirect URL requests with the old domain name to a URL with the new domain name. If a domain name has a common misspelling, the owner of the domain name could have the misspelled variation redirected to the correctly spelled, valid domain name. Also, many organizations having a ".com" top level domain reserve the same name with other top level domains such as, ".net" and ".org" so that a user who inadvertently uses the wrong top level domain can be automatically redirected to the valid URL of the organization's website.

URL redirection is frequently implemented at the server side. A server side redirect is a method of URL redirection using an HTTP (i.e., Hypertext Transfer Protocol) '3xx' status code (e.g., 300—multiple choices, 301—moved permanently, 302—found-temporary redirect, 303—see other-cgi scripting results, and 307—temporary redirect) issued by a web server in response to a request for a particular URL. When generating response headers with a '3xx' status code, the web server also includes a 'Location:' parameter with a new URL. If a browser receives a '3xx' status code, typically, the browser will send another request using the new URL returned by the web server. An alternative method of achieving server side redirection is to employ the "meta refresh" technique in the HTTP header. This technique was implemented as a feature in Netscape Navigator 1.1 and is now supported by many browsers. When server side redirection has been implemented using the "meta refresh" technique, the web server returns an HTTP status code (e.g., 200-ok) and a refresh header with a 'URL:' parameter containing a new URL. Server side scripting and .htaccess file are two example methods that may be used to implement server side redirects.

URL shortening is a special kind of server side redirection in which a provider makes a web page available under a very short URL in addition to its original network address, which could contain hundreds of characters. For example, the provider TinyURL.com allows the creation of a shortened URL, such as, for example, "tinyurl.com/xxxx", to access a web page that already has an original, often much longer, URL. Many micro blogging and social networking applications (e.g., Twitter™, Facebook®, MySpace™, etc.) are increasingly using such URL shortening and redirection services. Twitter, for example, limits the number of characters that can be used for messaging and, therefore, shortened URLs save valuable character space. In other contexts, extremely long URLs are difficult to remember and may lose continuity when copied into certain applications such as email. Thus, URL redirection and URL shortening can be useful tools for users.

These server side URL redirection techniques, however, have been exploited by malicious users in order to gain unauthorized access to computer systems and confidential information. URL redirection and URL shortening have been incorporated into Internet schemes (e.g., phishing, drive-by download, other social engineering attacks, etc.) to cause end users to unwittingly access malicious web pages. In one example scenario, malicious server side URL redirection may be accomplished by a malicious user gaining unauthorized access to a server hosting a legitimate site, inserting unauthorized code, and compromising the security of the legitimate site with a link that redirects to another site. Malicious URL shortening may occur when a shortened URL is created for a malicious website and then an end user is somehow tricked into accessing the shortened URL. Current risk rating technologies fail to pro-actively identify and alert users when server side redirections to malicious websites occur.

The Koobface worm is a real-world example of a malicious URL redirection scheme. Koobface targets social networking websites such as Facebook, MySpace, Twitter, and the like. It spreads by delivering messages to 'friends' within the social networking website of an end user whose computer has been infected. The messages direct recipients (i.e., 'friends') to a legitimate link, such as Google Reader, which is a service allowing its users to share news through a registered account. Malicious users behind the Koobface worm, however, may have registered accounts with Google Reader and then loaded the accounts with links to malicious sites. After clicking on the legitimate Google Reader link, the recipient may be redirected to one of the malicious sites. Current risk rating products, in addition to other safety mechanisms of the social networking sites, may fail to identify the malicious site because the initial URL link is directed to a legitimate, non-malicious site, such as Google Reader.

A system and method for risk rating and detecting redirection activities, as outlined in FIG. 1, can minimize the success of such schemes that redirect unsuspecting end users to malicious websites. In accordance with one example implementation, system 10 is provided to pro-actively detect server side URL redirection, determine risk ratings for any unknown URLs detected along a redirection path, and take appropriate action if a URL has been redirected to a malicious website. In one embodiment, an end user may be alerted to the risk rating associated with the malicious website. In other embodiments, such as, for example, a company network, the end user may be blocked from accessing any website having a malicious risk rating. System 10 provides pro-active detection of server side URL redirection, so that end users may be warned about computer security risks such as malicious shortened URLs used in micro blogging and social networking sites, misuse of URL redirection and shortening services, worms that employ URL redirection techniques, phishing and drive-by download attacks using URL links and embedded URLs in web pages and document and media files, and the like. Thus, system 10 provides information needed by end users to make more informed decisions about the risks associated with the actual websites they attempt to access. As a result, system 10 provides better protection of computers and computer networks.

Turning to the infrastructure of FIG. 1, network 12 may be configured as one or more networks and may be configured in any form including, but not limited to, local area networks (LANs), wide area networks (WANs) such as the Internet, or any combination thereof. In one embodiment, client 20 may be operably coupled to network 12 (e.g., the Internet) by an Internet Service Provider (ISP) or through an Internet Server with dedicated bandwidth. The connection between client 20 and network 12 may include any appropriate medium such as, for example, digital subscriber lines (DSL), telephone lines, T1 lines, T3 lines, wireless, satellite, fiber optics, cable, Ethernet, etc. or any combination thereof. In addition, gateways, routers and the like may be used to facilitate electronic communication between client 20 and network 12. The ISP or Internet Server may be configured to allow client 20 to communicate with other nodes on the Internet using Transmission Control Protocol/Internet Protocol (TCP/IP) and a mail server (not shown) may allow client 20 to send and receive email messages using Simple Mail Transfer Protocol (SMTP).

In one example embodiment, client 20 may be an end user computer operated by an individual. In an alternative embodiment, network 12 may include the Internet and a network environment for an organization (e.g., company, school, government, etc.) and client 20 may be one of a plurality of end user computers connected to network 12 and operated by employees of the company, for example. In such a configuration, components shown in client 20, such as browser 21 and advisory module 22, may be included in another computer (e.g., a network server, etc.) to provide functionality for the plurality of clients. The end user computers may include desktops, laptops, or mobile or handheld computing devices (e.g., personal digital assistants (PDAs) or mobile phones) or any other computer capable of connecting to the Internet. It should be noted that the network configurations and interconnections shown and described herein are for illustrative purposes only. FIG. 1 is intended as an example and should not be construed to imply architectural limitations in the present disclosure.

In the example embodiment shown in FIG. 1, advisory module 22 may be a client-side end point program and may be configured as a plug-in for browser 21. Advisory module 22 may be configured to identify any URL link, which may be found in access requests, web pages, document files, flash files, media files, and the like. Such URL links could include a URL entered by an end user into browser 21, a URL hyperlink clicked on by an end user, or a URL shown or embedded in some type of file. In another embodiment, advisory module 22 may also detect whether a URL is being redirected and send any resulting URLs to reputation system 80 in network cloud 14.

In one example embodiment, system 10 includes web servers 30, 35, and 40, operably connected to network 12 and accessible through network 12 by client 20. Trusted web server 30 represents a legitimate and nonmalicious web server, previously determined to be safe by, for example, malware analysis system 60. In one example embodiment, trusted web server 30 may have a safe risk rating in one or both of URL reputation database 58 and redirection reputation database 78. Unknown web server 35 represents a web server that has not been previously evaluated, and, therefore, does not have a risk rating in URL reputation database 58 or in redirection reputation database 78. Malicious web server 40 represents a web server that has been previously identified as malicious, such as, for example, a web server with websites known to spread malware or to deceitfully solicit confidential information from users. In one example embodiment, malicious web server 40 may have a malicious risk rating in one or both of URL reputation database 58 and redirection reputation database 78.

In FIG. 1, an example URL redirection path is represented by broken lines from trusted web server 30 to unknown web server 35 and from unknown web server 35 to malicious web server 40. In this example URL redirection path, a parent URL for trusted web server 30 has been redirected at the server side to an intermediate URL on unknown web server 35, and the intermediate URL has been redirected to a final URL on malicious web server 40. Therefore, a request to access the parent URL of the trusted web server 30 may be ultimately redirected to the final URL on malicious web server 40. The servers shown in FIG. 1 are exemplary, and it will be appreciated that any number of web servers, having any number or configurations of URL redirections, may be operably connected to network 12 and accessible to client 20.

Reputation system 80 may be configured in one embodiment as a cloud based distributed server system, including URL reputation server 50, redirection reputation server 70, and malware analysis system 60. Malware analysis system 60 may be adapted to provide evaluation activities for electronic data such as that which could be resident in web sites, graphics, text, document files, flash files, media files, email, or any other suitable data for which the malware analysis system 60 is configured to evaluate. Information related to the evaluation can be suitably rendered, or sent to a specific location (e.g., client 20, etc.), or simply stored or archived, and/or properly displayed in any appropriate format. Security technology that performs one or more of such evaluation activities can include elements such as SiteAdvisor® (manufactured by McAfee Inc. of Santa Clara, Calif.) or any other similar software configured to perform these evaluation activities. Thus, any such components may be included within the broad scope of the term 'malware analysis system' as used herein in this Specification. URL reputation server 50 and redirection reputation server 70 may be operably connected to malware analysis system 60 and configured to provide access to URL reputation database 58 and redirection reputation database 78, respectively. The reputation databases 58 and 78 may include information related to the evaluation of electronic data, such as risk ratings determined for URLs and these elements can readily cooperate, coordinate, or otherwise interact with malware analysis system 60.

Redirection module 76 of redirection reputation server 70 may be adapted to perform URL redirection analysis to determine whether a URL has been redirected at the server side. In one embodiment, redirection reputation database 78 may be configured to store URLs detected during redirection analysis, associated risk ratings (e.g., risk ratings determined by malware analysis system 60, risk ratings in URL reputation database 58, etc.), and any other information related to the server side redirection of URLs (e.g., redirection flag, timestamp, final URL, etc.). Moreover, any unknown URLs detected during redirection analysis may be submitted to malware analysis system 60 to determine the presence of malware or other malicious activities and a resultant risk rating.

Reputation system 80 allows for a broad range of hardware and software configurations. For example, redirection reputation database 78 may be implemented separately in one example embodiment, but could be integrated with URL reputation database 58 in another embodiment. Similarly, alternative configurations of URL reputation server 50, redirection reputation server 70, and malware analysis system 60, and the associated software for accessing reputation databases 58 and 78 and performing redirection analysis are within the broad teachings of this disclosure. The particular configurations of reputation servers 50 and 70 and reputation databases 58 and 78 may be determined based on performance and product implementation criteria.

Figure 2:
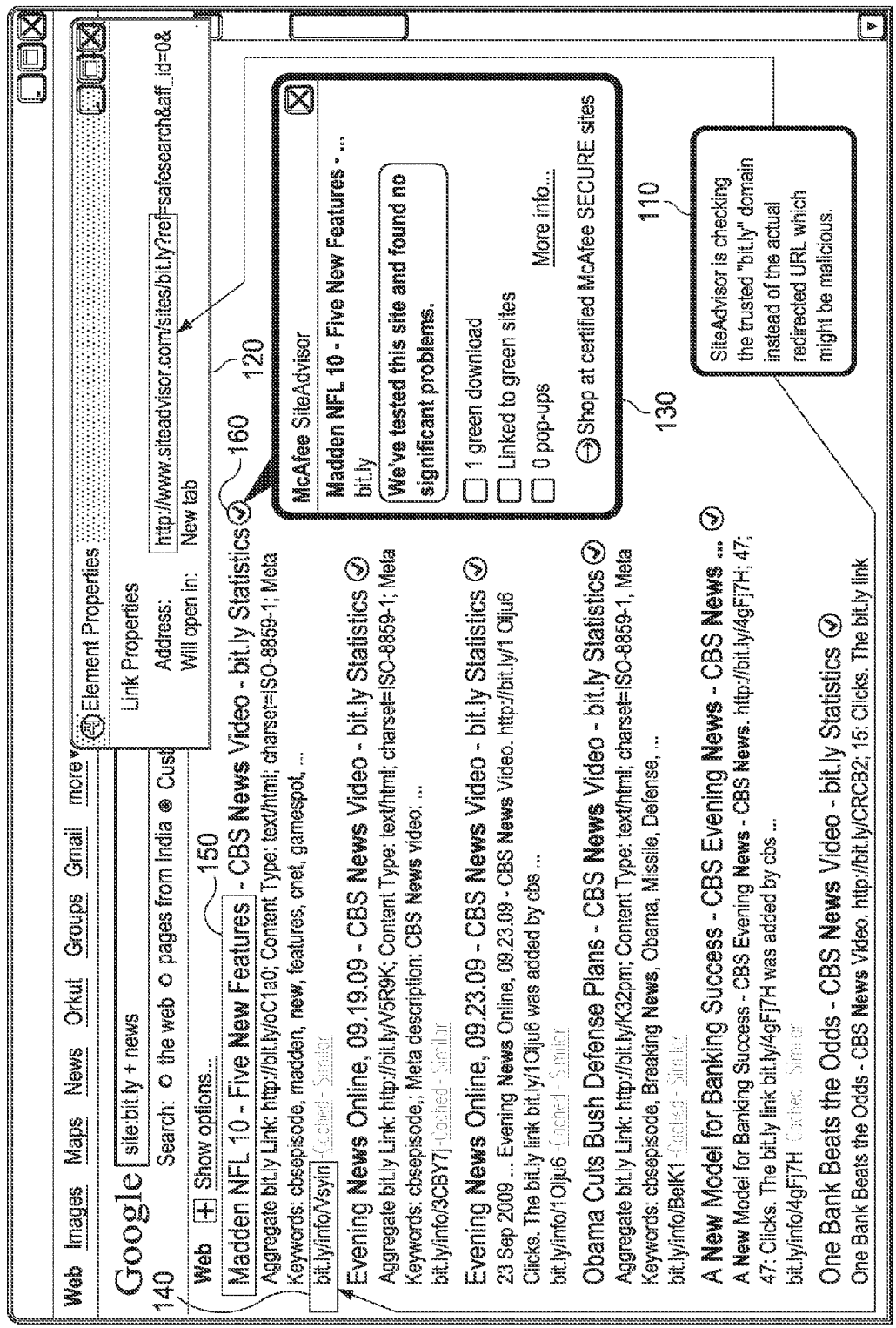
FIG. 2 is an example web page illustrating an Internet search and risk ratings provided by one example risk rating service.

FIG. 2 exemplifies how existing technologies do not proactively detect server side URL redirection. FIG. 2 illustrates an example web page 100 that could be returned after an end user instructs an Internet search engine to search for the "bit.ly" domain using a "news" parameter. In one embodiment, example web page 100 could be displayed on user interface 28 of client 20. Information box 110 points to one example URL hyperlink 140 corresponding to web page option 150 with risk rating 160. Box 120 shows the link to SiteAdvisor software with the domain "bit.ly" from URL hyperlink 140 to be evaluated for its associated risk rating. Box 130 shows the pop-up box associated with risk rating 160 indicating that SiteAdvisor software determined web page option 150 to be safe. In this example, however "bit.ly" is a URL shortener and, therefore, URL hyperlink 140 (i.e., bit.ly/info/Vsyin) is redirected to another URL that contains the actual address of the web page the URL hyperlink 140 will return to the user after being selected. Consequently, while the "bit.ly" domain may have been correctly identified as safe by SiteAdvisor software, the actual web page to which URL hyperlink 140 has been redirected has not been evaluated to determine whether it is malicious. Therefore, such risk rating technologies may not be beneficial when the URL hyperlink has been redirected at the server side.

Figure 3:
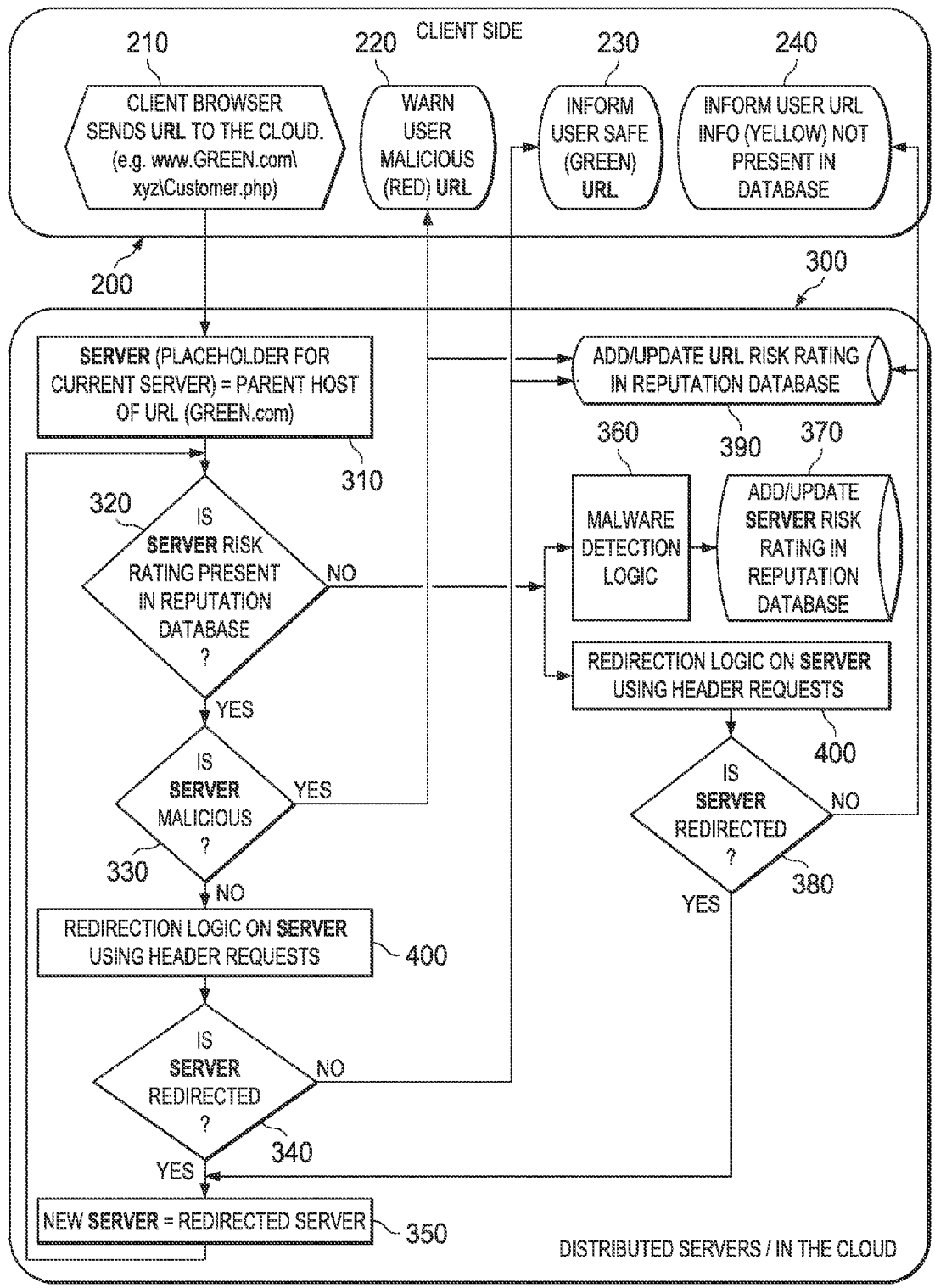
FIG. 3 is a simplified flowchart illustrating a series of example steps of processes associated with the system in accordance with one embodiment of the present disclosure.

Turning to FIG. 3, a simplified flowchart is depicted illustrating a client side process 200 and a distributed server process 300 associated with one implementation for risk rating and detecting redirection activities. Processes 200 and 300 will be explained herein with reference to specific operations in FIG. 3 and related hardware, software, and network components of FIG. 1.

In one example embodiment, client-side process 200 may be implemented in a browser plug-in, such as advisory module 22 in client 20. Client-side process 200 may begin at step 210 with advisory module 22 sending a URL to reputation system 80 in network cloud 14 where distributed server process 300 receives the URL. The URL may be any URL identified by advisory module 22 such as a URL entered by an end user into browser 21 or a URL hyperlink shown or embedded in some type of file or web page. In one embodiment, every URL identified by advisory module 22 may be sent to distributed server process 300 including, for example, multiple URL links identified from a single web page.

In one embodiment, distributed server process 300 may be implemented in risk rating module 56 of URL reputation server 50. Once distributed server process 300 receives the URL, in step 310 a temporary variable, such as, for example "SERVER" may be used to hold the parent host of the received URL. Flow then passes to step 320 to evaluate SERVER variable to determine if an associated risk rating is present in any reputation database, such as URL reputation database 58 or redirection reputation database 78. As previously noted, however, alternative embodiments may implement URL reputation database 58 and redirection reputation database 78 differently including, for example, integrating them into one reputation database. In yet other embodiments, only one reputation database 58 or 78 may be searched in step 320 depending on the configuration of the databases 58 and 78 and whether the SERVER variable holds the host of a parent URL received from client-side process 200 or the host of a URL to which the parent URL was redirected.

If a risk rating is found in step 320, then flow passes to step 330 to determine whether the risk rating indicates that SERVER variable is a malicious website. If a malicious risk rating is ascertained, then the URL risk rating may be added or updated in the appropriate reputation databases 58 and/or 78 in step 390, and the risk rating may be sent to step 220 in client-side process 200 where the end user may be alerted that the URL is malicious. In one example embodiment, if the URL was retrieved from a web page, a malicious alert (e.g., red 'X') may be displayed near the URL hyperlink or its corresponding description on user interface 28 of client 20. If the URL was retrieved from an end user's access request using browser 21, then other appropriate actions may be taken. In one embodiment, a malicious alert may be displayed in a screen showing the URL on user interface 28 of client 20. In another example embodiment, a pop up screen may be displayed with a warning to the user and a confirmation option the user must select to obtain access to the malicious website. Having a displayed risk rating for the URL enables the end user to make an informed decision about accessing the particular URL. In yet another embodiment, the end user may be blocked from accessing any URL having a malicious risk rating.

With reference again to step 330, if the risk rating for SERVER variable indicates that SERVER variable is not a malicious website, then redirection logic 400 (shown and described with reference to FIG. 4) may be performed to determine whether the URL associated with SERVER variable has been redirected on the server side. After redirection logic 400 has been completed, step 340 queries whether SERVER variable has been redirected. If there has been no server side URL redirection, then the URL risk rating may be added or updated in the appropriate reputation databases 58 and/or 78 in step 390, and the risk rating may be sent to step 230 in client-side process 200 where the end user may be alerted that the URL is safe. In one example embodiment, if the URL was retrieved from a web page, a safe alert (e.g., green '✓') may be displayed near the URL hyperlink or its corresponding description on user interface 28 of client 20 (e.g., risk rating 160 shown and described with reference to example Internet search web page in FIG. 2). If the URL was retrieved from an end user's access request using browser 21, then in one example embodiment, the browser 21 may be allowed to retrieve and display the web page without any additional displayed messages or alerts on user interface 28 of client 20.

With reference again to step 320, if SERVER variable is not found in one of the reputation databases 58 or 78, then flow passes to step 360 to perform malware detection logic, which may be configured in malware analysis system 60. Malware detection logic evaluates the website associated with SERVER variable for the presence of any malware activity or other malicious activity, and then in step 370 a risk rating for SERVER variable may be added or updated in the appropriate reputation databases 58 and/or 78.

In one embodiment, as malware detection logic is evaluating SERVER variable in step 360, redirection logic 400 may also be evaluating the URL associated with SERVER variable to determine whether it has been redirected at the server side. After redirection logic 400 has been completed, step 380 queries whether SERVER variable has been redirected. If there has been no server side URL redirection, then the URL risk rating may be added or updated in the appropriate reputation databases 58 and/or 78 in step 390, and the risk rating may be sent to step 240 in client-side process 200 where the end user may be alerted that a risk rating was not found in the reputation databases 58 or 78 for the URL associated with SERVER variable. In one example embodiment, if the URL was retrieved from a web page, an unknown alert (e.g., yellow '!') may be displayed near the URL hyperlink or its corresponding description on user interface 28 of client 20. If the URL was retrieved from an end user's access request using browser 21, then, in one embodiment, the unknown alert may be displayed near the URL on user interface 28 of client 20. In another example embodiment, a pop up screen may be displayed with a warning to the user and a confirmation option the user must select to obtain access to the unknown website. Although examples of various types of alerts (e.g., malicious, safe, and unknown) have been described herein, any number of alternative approaches and alerts may be implemented to handle notifying the end user of a risk rating and determining which actions the end user is allowed to take after receiving a risk rating.

With reference again to steps 340 and 380, if a determination is made in either of these steps that there has been server side URL redirection, then flow passes to step 350 where a new SERVER variable is set to the host of a new URL to which the previous URL has been redirected. Flow then loops back to step 320 where the steps of process 300 are performed on new SERVER variable to determine a risk rating for new Server variable and to alert the end user accordingly.

Figure 4:
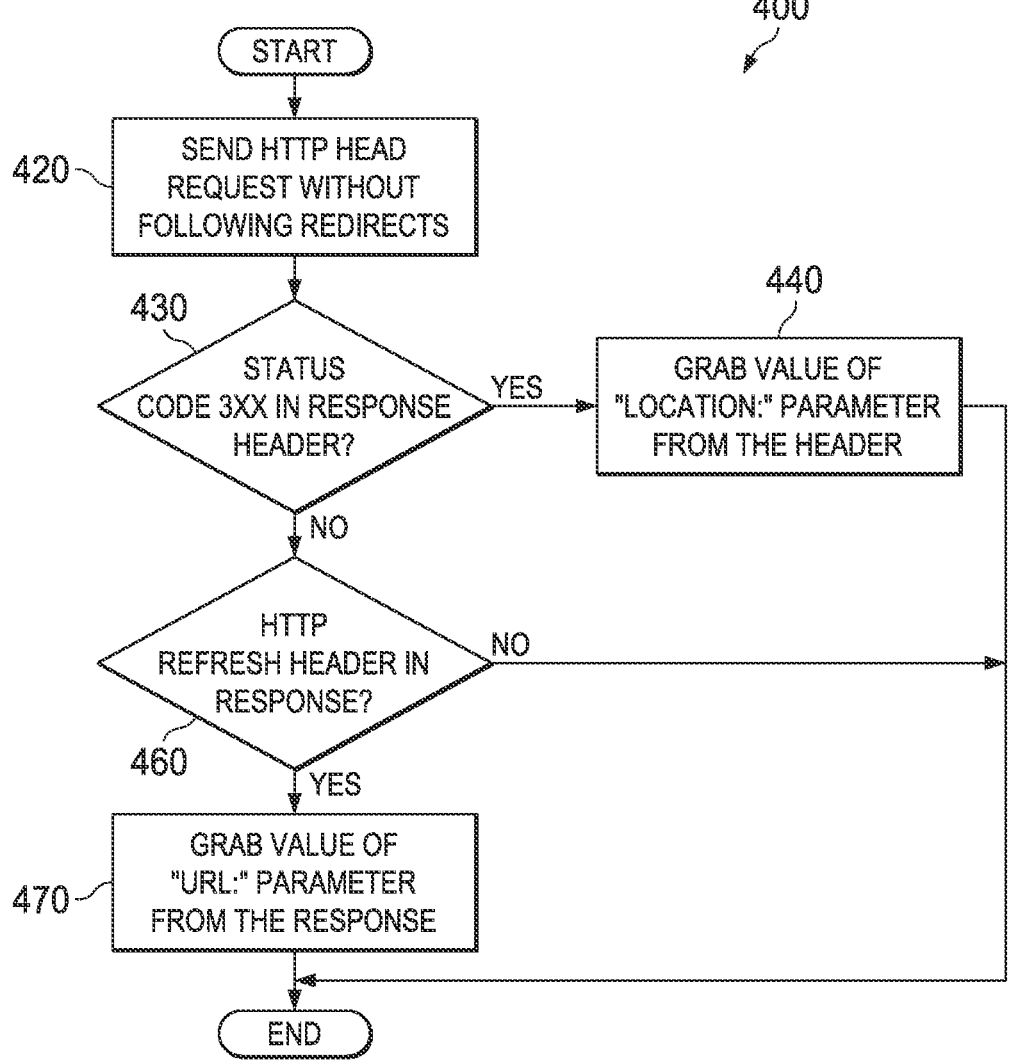
FIG. 4 is a simplified flowchart illustrating a series of example steps of another process associated with the system in accordance with one embodiment of the present disclosure.

Turning to FIG. 4, a simplified flowchart illustrates redirection logic 400 for determining whether a current URL has been redirected at the server side. Redirection logic 400 may be initiated from distributed server process 300 as shown in FIG. 3 and, in one embodiment, may be implemented in redirection module 76 of redirection reputation server 70. Redirection logic 400 may begin in step 420 where an HTTP HEAD request may be sent to the actual server indicated by the current URL associated with SERVER variable of process 300. A query is then made in step 430 to determine whether response headers, which are received from the actual server in response to the HEAD request, include a '3xx' status code indicating that the current URL has been redirected (e.g., Status codes 300, 301, 302, 303 or 307). If one of the '3xx' status codes has been returned in the response headers, then the flow passes to step 440 where a new URL is retrieved from a "Location:" parameter in the response header. Redirection logic 400 ends and the flow may then return to step 340 or 380 in distributed server process 300 with the new URL.

In one example embodiment, the HTTP HEAD request is crafted for the current URL such that redirects will not be followed. Thus, even if the response headers indicate the current URL has been redirected, no further HTTP HEAD requests will be sent to follow the redirection path and determine a final URL to which the current URL has been redirected. Therefore, in this embodiment, the new URL returned in the "Location:" parameter is only the next URL hop to which the current URL has been redirected. It will be apparent that the new URL may or may not be subject to server side redirection and, therefore, may or may not be the final URL in the redirection path.

With reference again to step 430, if the response headers do not return a '3xx' status code, then the flow passes to step 460 to determine whether a refresh header has been returned. If a refresh header has been returned, then the flow passes to step 470 where a new URL is retrieved from a "URL:" parameter in the refresh header. Redirection logic 400 ends and the flow may then return to step 340 or 380 in distributed server process 300 with the new URL. If it is determined in step 460 that a refresh header was not returned, however, then redirection logic 400 ends and the flow may then return to step 340 or 380 in distributed server process 300 without a new URL, indicating that the current URL associated with SERVER variable of process 300 has not been redirected.

Although FIG. 4 represents one example embodiment for determining whether a current URL has been redirected at the server side, alternative logic could be implemented to achieve this result. For example, redirection logic 400 may alternatively be configured to follow redirects. In this alternative embodiment, HTTP HEAD requests would continue to be sent with new URLs received in response headers or refresh headers until a status code indicated something other than redirection has occurred. Any new URLs returned in the "Location:" parameter of the response headers or the "URL:" parameter of the refresh headers could be stored and then evaluated by distributed server process 300 for associated risk ratings.

In addition to HEAD requests, alternative request methods may also be used to determine whether redirection has occurred. For example, a GET request may be used to elicit a response with response headers indicating whether a particular URL has been redirected. The response to the GET request, however, would also include a content body from the URL. Thus, because responses to other request methods may provide different information and/or different operations, appropriate modifications to redirection logic 400 could be necessary to handle any differing information and operations resulting from the responses.

Figure 5:
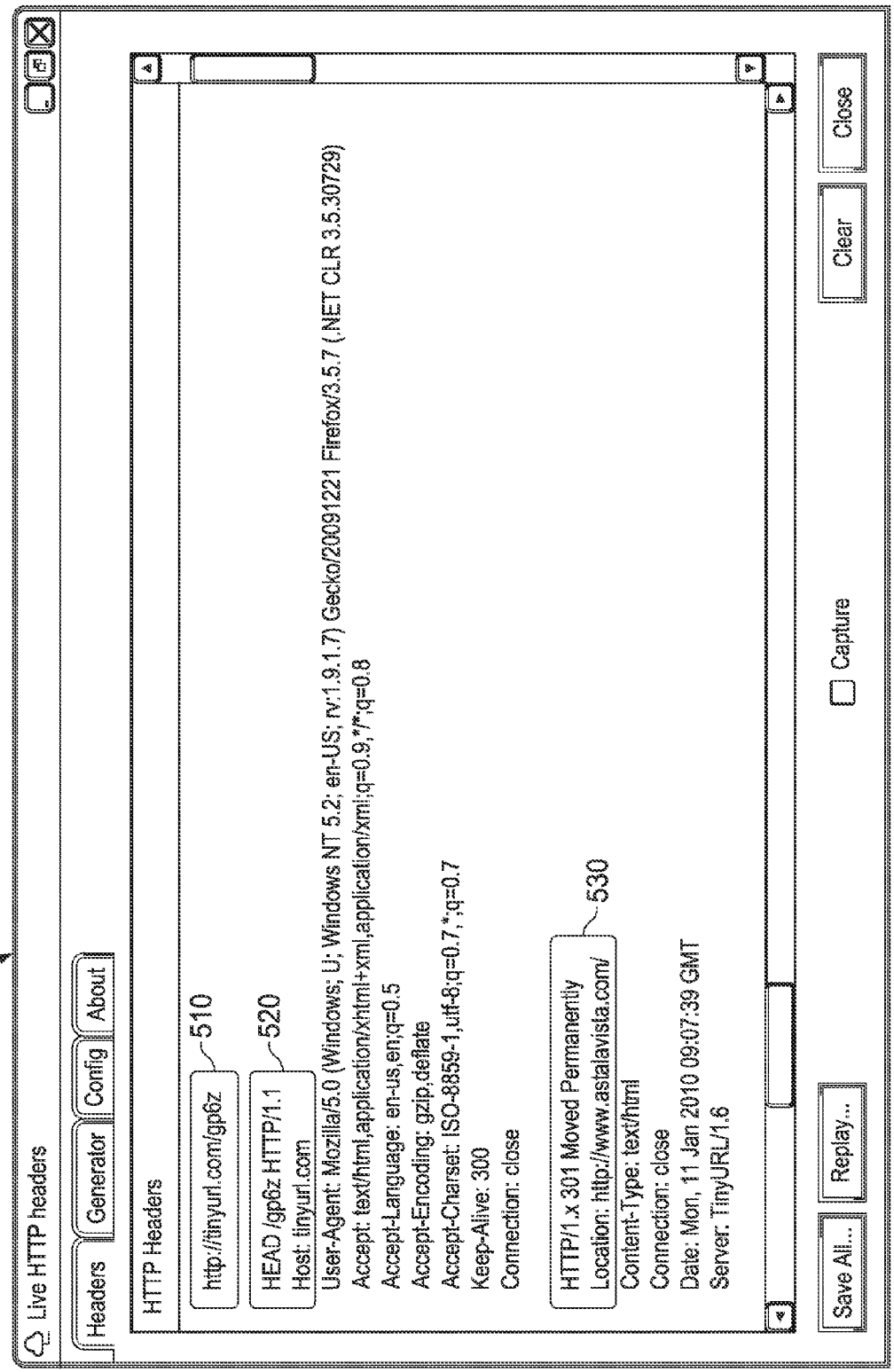
FIG. 5 is a screenshot of Live HTTP (Hypertext Transfer Protocol) Headers showing an example HEAD request and the corresponding response headers that could occur in an example scenario in accordance with one embodiment of the present disclosure.

Turning to FIG. 5, FIG. 5 illustrates a screenshot 500 of Live HTTP Headers showing an example HEAD request and corresponding response headers that could occur in an example scenario of redirection logic 400. In FIG. 5, an example current URL 510 (i.e., http://tinyurl.com/gp6z) may be sent to a server in a first HEAD request 520. In this example scenario, the host is "tinyurl.com", which is a URL shortener as previously discussed herein. Because current URL 510 is a shortened URL, it has been redirected at the tinyurl.com server. Therefore, in response to first HEAD request 520, first response headers 530 are returned with status code "301" indicating that current URL 510 has been permanently moved. A "Location:" parameter is also returned in first response headers 530 with a new URL (i.e., http://www.astalavista.com/) to which current URL 510 has been redirected.

Figure 6:
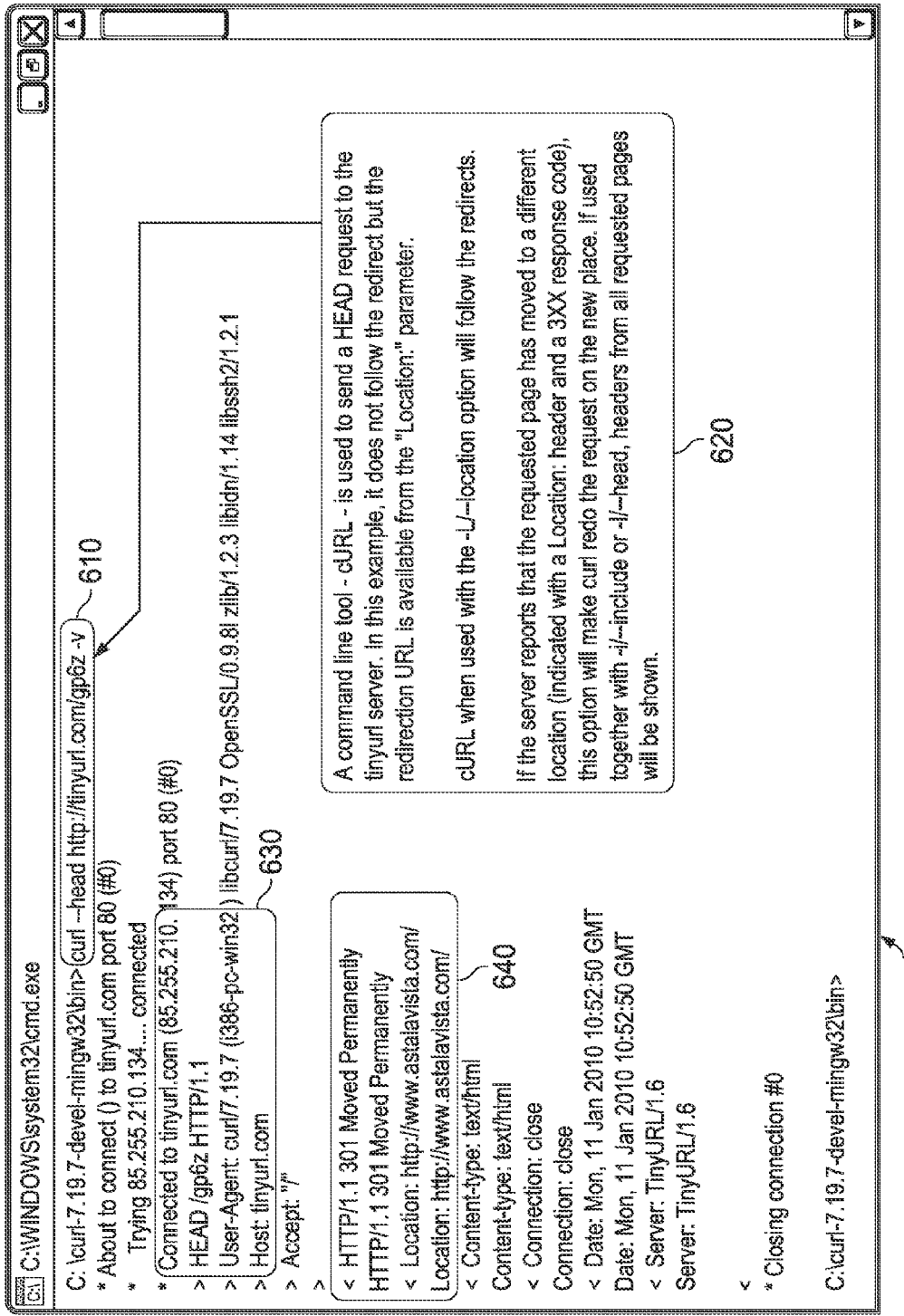
FIG. 6 is a screenshot of cURL command line tool being used to send an example HEAD request that could occur in an example scenario in accordance with one embodiment of the present disclosure.

Now turning to FIG. 6, a screenshot 600 illustrating one example programming tool used to send crafted HTTP HEAD requests is shown. CURL command line tool is used to send an HTTP HEAD request 630 for an example current URL (i.e., http://tinyurl.com/gp6z), where HEAD request 630 is crafted so that it does not follow redirects. Information box 620 explains that cURL needs the '-L/' location option in order for HEAD requests to follow redirects. Because cURL command line 610 does not contain the '-L/' location option, when response header 640 is returned with status code 301 and a new URL in a "Location:" parameter (i.e., http://www.astalavista.com/), no further HEAD requests are sent. While the cURL command line tool is one example programming tool that may be used to implement redirection logic 400, many alternative programming languages and tools are also available for issuing crafted HEAD requests and receiving response headers, and therefore, may be used to implement redirection logic 400.

An example scenario will now be explained with reference to the processes of FIGS. 3 and 4 and the block diagram of FIG. 1. In the example scenario, an end user may use browser 21 of client 20 to request access to a legitimate and nonmalicious parent URL, http://green.com/xyz/customer.php. In this example scenario, however, the parent URL has been redirected at the server side to a malicious website as follows:

green.com/xyz/customer.php redirects to=>unknown.com redirects to=>red.com green.com/xyz/customer.php=>hosted on trusted web server 30 unknown.com=>hosted on unknown web server 35
red.com=>hosted on malicious web server 40

Beginning in client process 200 of FIG. 3, in step 210 the parent URL may be sent from advisory module 22 of client 20 to reputation system 80 in network cloud 14. A temporary variable, SERVER, is set to the parent host (i.e., green.com) in step 310. In step 320, URL reputation database 58 is searched for parent SERVER and it is located. In step 330, parent SERVER is determined to have a safe risk rating from URL reputation database 58 and flow passes to redirection logic 400.

Referring now to FIG. 4, in step 420 a HEAD request with parent URL (i.e., http://green.com/xyz/customer.php) may be sent without the option to follow redirects. For example, if cURL command line tool is used, then the '-L/' location option would not be included, and therefore, redirects would not be followed. In step 430, a determination is made as to whether response headers were returned with a '3xx' status code. Because the parent URL has been redirected, a status code of 301 may be returned with an intermediate URL (i.e., http://unknown.com/) in the "Location:" parameter. Flow then passes to step 440 to grab the intermediate URL from the "Location:" parameter. Logic 400 then returns the new, intermediate URL back to process 300.

Referring back to FIG. 3, in step 340 of process 300 a determination is made that parent SERVER was redirected, based on input from redirection logic 400 and, therefore, flow passes to step 350 where new (intermediate) SERVER is set to the intermediate host (i.e., unknown.com). Flow then loops back to step 320 where redirection reputation database 78 may be searched for new (intermediate) SERVER. As will be appreciated, URL reputation database 58 may also be searched or, alternatively, URL reputation database 58 and redirection reputation database 78 may be integrated. In step 320, a determination is made whether a risk rating is present in reputation databases 58 and/or 78. Because new (intermediate) Server is unknown, flow passes to step 360 where malware detection logic of malware analysis system 60 evaluates new (intermediate) SERVER for the presence of any malware activity or any other malicious activity. Once malware detection logic is complete, in step 370, new (intermediate) SERVER is added or updated in the appropriate reputation database 58 and/or 78.

With reference again to step 320, when flow passes to step 360, flow also passes to redirection logic 400 to determine if the intermediate URL associated has been redirected. In step 420, a HEAD request with intermediate URL (i.e., http://unknown.com/) may be sent without the option to follow redirects. In step 430, a determination is made as to whether response headers were returned with '3xx' status code. Because the intermediate URL has been redirected, a status code of 301 may be returned with the final URL (i.e., http://red.com/) in the "Location:" parameter. Flow then passes to step 440 to grab the final URL from the "Location:" parameter. Logic 400 then returns the new, final URL back to process 300.

Referring back to FIG. 3, in step 380 of process 300, a determination is made that new (intermediate) SERVER was redirected, based on input from redirection logic 400 and, therefore, flow passes to step 350 where new (final) SERVER is set to the final host (i.e., red.com). Flow then loops back to step 320 where redirection reputation database 78 and/or URL reputation database 58 may be searched for new (final) SERVER. In step 320, a determination is made that a risk rating is present in reputation databases 58 and/or 78 and flow then passes to step 330. Because new (final) SERVER has a malicious risk rating determined in step 330, flow passes back to step 220 of process 200 where the end user may be warned through user interface 28 of client 20 that the parent URL (i.e., www.green.com\xyz\Customer.php) is malicious, because it has been redirected to a malicious site (i.e., red.com). In addition, in step 390 the parent URL risk rating may also be updated in the appropriate reputation databases 58 and/or 78.

Software for achieving the operations outlined herein can be provided at various locations (e.g., the corporate IT headquarters, end user computers, distributed servers in the cloud, etc.). In other embodiments, this software could be received or downloaded from a web server (e.g., in the context of purchasing individual end-user licenses for separate networks, devices, servers, etc.) in order to provide this system for risk rating and detecting redirection activities. In one example implementation, this software is resident in one or more computers sought to be protected from a security attack (or protected from unwanted or unauthorized manipulations of data).

In other examples, the software of the system for risk rating and detecting redirection activities in a computer network environment could involve a proprietary element (e.g., as part of a network security solution with McAfee SiteAdvisor and TrustedSource™ software, McAfee Artemis Technology software, McAfee Host Intrusion Prevention software, McAfee VirusScan software, etc.), which could be provided in (or be proximate to) these identified elements, or be provided in any other device, server, network appliance, console, firewall, switch, information technology (IT) device, distributed server, etc., or be provided as a complementary solution (e.g., in conjunction with a firewall), or provisioned somewhere in the network.

In an example system 10 (as shown in FIG. 1), client 20, web servers 30, 35, and 40, malware analysis system 60, and reputation servers 50 and 70 are computers that facilitate risk rating and detecting redirection activities. As used herein in this Specification, the term 'computer' is meant to encompass any personal computers, network appliances, routers, switches, gateways, processors, servers, load balancers, firewalls, or any other suitable device, component, element, or object operable to affect or process electronic information in a network environment. Moreover, this computer may include any suitable hardware, software, components, modules, interfaces, or objects that facilitate the operations thereof. This may be inclusive of appropriate algorithms and communication protocols that allow for the effective protection and communication of data.

In certain example implementations, the risk rating and detecting URL redirection activities outlined herein may be implemented in software. This could be inclusive of software provided in client 20 (e.g., via advisory module 22), URL reputation server 50 (e.g., via risk rating module 56), and/or redirection reputation server 70 (e.g., via redirection module 76). These elements and/or modules can cooperate with each other in order to perform risk rating and URL redirection detection, as discussed herein. In other embodiments, these features may be provided external to these elements, included in other devices to achieve these intended functionalities, or consolidated in any appropriate manner. For example, the servers can be readily combined into a single unit, where some of the illustrated processors may be removed, or otherwise consolidated such that a single processor and a single memory location are responsible for certain activities. In a general sense, the arrangement depicted in FIG. 1 may be more logical in its representation, whereas a physical architecture may include various permutations/combinations/hybrids of these elements.

Alternatively, all of these elements (client 20, URL reputation server 50, and/or redirection reputation server 70) include software (or reciprocating software) that can coordinate, manage, or otherwise cooperate in order to achieve the risk rating and URL redirection detection operations, as outlined herein. In still other embodiments, one or all of these elements may include any suitable algorithms, hardware, software, components, modules, interfaces, or objects that facilitate the operations thereof. In the implementation involving software, such a configuration may be inclusive of logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, one or more memory elements (as shown in FIG. 1) can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processors (as shown in FIG. 1) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)) or an ASIC that includes digital logic, software, code, electronic instructions, or any suitable combination thereof.

Any of these elements (e.g., a computer, a server, a network appliance, a firewall, distributed server, etc.) can include memory elements for storing information to be used in achieving the system for risk rating and detecting redirection activities as outlined herein. Additionally, each of these devices may include a processor that can execute software or an algorithm to perform the risk rating and redirection detecting activities as discussed in this Specification. These devices may further keep information in any suitable memory element (e.g., random access memory (RAM), ROM, EPROM, EEPROM, ASIC, etc.), software, hardware, or in any other suitable component, device, element, or object where appropriate and based on particular needs. Any of the memory items discussed herein (e.g., URL reputation database, redirection reputation database, memory elements, etc.) should be construed as being encompassed within the broad term 'memory element.' Similarly, any of the potential processing elements, modules, and machines described in this Specification should be construed as being encompassed within the broad term 'processor.' Each of the computers, network appliances, servers, distributed servers, etc. may also include suitable interfaces for receiving, transmitting, and/or otherwise communicating data or information in a network environment.

Note that with the examples provided herein, interaction may be described in terms of two, three, four, or more network components. However, this has been done for purposes of clarity and example only. It should be appreciated that system 10 can be consolidated in any suitable manner. Along similar design alternatives, any of the illustrated computers, modules, components, and elements of FIG. 1 may be combined in various possible configurations, all of which are clearly within the broad scope of this Specification. For example, URL reputation server 50, URL reputation database 58, redirection reputation server 70, and redirection reputation database 78, may be independently configured and interconnected or, alternatively, may be integrated into one or more network components. In certain cases, it may be easier to describe one or more of the functionalities of a given set of flows by only referencing a limited number of components or network elements. Therefore, it should also be appreciated that the system of FIG. 1 (and its teachings) is readily scalable. System 10 can accommodate a large number of components, as well as more complicated or sophisticated arrangements and configurations. Accordingly, the examples provided should not limit the scope or inhibit the broad teachings of system 10 as potentially applied to a myriad of other architectures.

It is also important to note that the operations described with reference to the preceding FIGURES illustrate only some of the possible scenarios that may be executed by, or within, system 10. Some of these operations may be deleted or removed where appropriate, or these operations may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by system 10 in that any suitable arrangements, chronologies, configurations, and timing mechanisms may be provided without departing from the teachings of the discussed concepts.

What is claimed is:

1. A method, comprising:
   receiving, from a client device in a network environment, a first network address to be evaluated;
   searching predetermined risk ratings in a memory element for a first predetermined risk rating associated with the first network address;
   configuring, when none of the predetermined risk ratings indicates the first network address is malicious, a first request to the first network address to prevent a redirection to another network address from being followed;
   sending the first request to the first network address;
   determining whether a first response to the first request indicates a first redirection from the first network address to a second network address; and
   searching the predetermined risk ratings for a second predetermined risk rating associated with the second network address if the first redirection from the first network address to the second network address is indicated in the first response,
   wherein, if the second predetermined risk rating is found and indicates the second network address is malicious, the first redirection is not followed and information is provided to the client device based on the second predetermined risk rating.

2. The method of claim 1, wherein the providing the information based on the second predetermined risk rating comprises sending an alert to the client device.

3. The method of claim 1, wherein the client device is blocked from accessing the second network address if the second predetermined risk rating indicates the second network address is malicious.

4. The method of claim 1, wherein the first response includes a status code indicating whether the first network address has been redirected, wherein the first response includes the second network address if the status code indicates the first network address has been redirected.

5. The method of claim 1, further comprising:
   sending a second request to the second network address hosted on a second server device if the second predetermined risk rating is found and indicates the second network address is trustworthy;
   searching the predetermined risk ratings for a third predetermined risk rating associated with a third network address if a second response to the second request indicates a second redirection from the second network address to the third network address, wherein the second redirection is not followed if the third predetermined risk rating is found and indicates the third network address is malicious.

6. The method of claim 1, further comprising:
   sending the second network address to a malware analysis system for determining a new risk rating for the second network address if the memory element does not include a predetermined risk rating associated with the second network address.

7. The method of claim 6, wherein the malware analysis system updates the memory element with the new risk rating and associates the new risk rating with the second network address.

8. The method of claim 1, wherein the first network address is a Uniform Resource Locator (URL) link retrieved from a selected one of a group consisting of a web page, a document file, a media file, or a flash file.

9. The method of claim 8, wherein the URL link is embedded in the web page, the document file, the media file or the flash file.

10. One or more non-transitory tangible media that includes code for execution and when executed by a processor is operable to perform operations comprising:
    receiving, from a client device in a network environment, a first network address to be evaluated;
    searching predetermined risk ratings in a memory element for a first predetermined risk rating associated with the first network address;
    configuring, when none of the predetermined risk ratings indicates the first network address is malicious, a first request to the first network address to prevent a redirection to another network address from being followed;
    sending the first request to the first network address;
    determining whether a first response to the first request indicates a first redirection from the first network address has to a second network address; and
    searching the predetermined risk ratings for a second predetermined risk rating associated with the second network address if the first redirection from the first network address to the second network address is indicated in the first response,
    wherein, if the second predetermined risk rating is found and indicates the second network address is malicious, the first redirection is not followed and information is provided to the client device based on the second predetermined risk rating.

11. The one or more non-transitory tangible media of claim 10, wherein the first response includes a status code indicating whether the first network address has been redirected, wherein the first response includes the second network address if the status code indicates the first network address has been redirected.

12. The one or more non-transitory tangible media of claim 10, the operations further comprising:
    sending a second request to the second network address when the none of the predetermined risk ratings indicates the second network address is malicious; and
    searching the predetermined risk ratings for a third predetermined risk rating associated with a third network address if a second response to the second request indicates a second redirection from the second network address to the third network address, wherein the second redirection is not followed if the third predetermined risk rating is found and indicates the third network address is malicious.

13. The one or more non-transitory tangible media of claim 10, wherein the first network address is a Uniform Resource Locator (URL) link retrieved from a selected one of a group comprising a web page, a document file, a media file, or a flash file.

14. An apparatus, comprising:
    a redirection module;
    a memory element configured to store one or more network addresses each having an associated risk rating; and
    a processor operable to execute instructions associated with the redirection module, including:
      receiving, from a client device in a network environment, a first network address to be evaluated;
      searching predetermined risk ratings in the memory element for a first predetermined risk rating associated with the first network address;
      configuring, when none of the predetermined risk ratings indicates the first network address is malicious, a first request to the first network address to prevent a redirection to another network address from being followed;

sending the first request to the first network address;

determining whether a first response to the first request indicates a first redirection from the first network address to a second network address; and searching the predetermined risk ratings for a second predetermined risk rating associated with the second network address if the first redirection from the first network address has been redirected to the second network address is indicated in the first response, wherein, if the second predetermined risk rating is found and indicates the second network address is malicious, the first redirection is not followed and information is provided to the client device based on the second predetermined risk rating.

15. The apparatus of claim 14, wherein the first response includes a status code indicating whether the first network address has been redirected, wherein the first response includes the second network address if the status code indicates the first network address has been redirected.

16. The apparatus of claim 14, wherein the processor is operable to perform further instructions, including sending the second network address to a malware analysis system for determining a new risk rating for the second network address if the memory element does not include a predetermined risk rating associated with the second network address.

17. The one or more non-transitory tangible media of claim 10, the operations further comprising:

sending a second request to the second network address hosted on a second server device if none of the predetermined risk ratings is associated with the second network address;

determining whether a second response to the second request indicates a second redirection from the second network address to a third network address; and updating the predetermined risk ratings with a new risk rating for the second network address, wherein the new risk rating indicates that the second network address is unknown if the second network address has not been redirected, and wherein the new risk rating indicates that the second network address is malicious if the second response indicates a second redirection from the second network address to the third network address and if the third network address is determined to be malicious.

18. The one or more non-transitory tangible media of claim 10, the operations further comprising:

updating the predetermined risk ratings to indicate that the first network address is malicious if the second predetermined risk rating indicates the second network address is malicious.

19. The apparatus of claim 14, wherein the processor is operable to execute further instructions associated with the redirection module, including:

sending a second request to the second network address when the none of the predetermined risk ratings indicates the second network address is malicious; and searching the predetermined risk ratings for a third predetermined risk rating associated with a third network address if a second response to the second request indicates a second redirection from the second network address to the third network address, wherein the second redirection is not followed if the third predetermined risk rating is found and indicates the third network address is malicious.

20. The apparatus of claim 14, wherein the processor is operable to execute further instructions associated with the redirection module, including:

updating the predetermined risk ratings to indicate that the first network address is malicious if the second predetermined risk rating indicates the second network address is malicious.

* * * * *

UNITED STATES PATENT AND TRADEMARK OFFICE
CERTIFICATE OF CORRECTION

Page 1 of 1

PATENT NO. : 8,869,271 B2
APPLICATION NO. : 12/698922
DATED : October 21, 2014
INVENTOR(S) : Shankar Jayaraman et al.

It is certified that error appears in the above-identified patent and that said Letters Patent is hereby corrected as shown below:

In the Claims

In column 15, line 45, Claim 5, after "trustworthy;" insert -- and --.

In column 16, line 19, Claim 10, after the first occurrence of "address" delete "has".

In column 17, line 11, Claim 14, after "network address" delete "has been redirected".

Signed and Sealed this
Twelfth Day of May, 2015

Michelle K. Lee
*Director of the United States Patent and Trademark Office*